United States Patent

Fischer et al.

[11] Patent Number: 5,835,647
[45] Date of Patent: Nov. 10, 1998

[54] DEVICE FOR GENERATING A LASER BEAM HAVING A HOMOGENIZED CROSS SECTION AND USE OF THIS BEAM

[75] Inventors: Manfred Fischer, Tuttlingen; Maximilian Reindl; Jorn Sander, both of Heroldsberg; Klaus Vogler, Eckental, all of Germany

[73] Assignees: Aesculap AG & Co. KG; Aesculap-Meditec GmbH, both of Germany

[21] Appl. No.: 800,200

[22] Filed: Feb. 13, 1997

Related U.S. Application Data

[63] Continuation of PCT/EP95/03006 Jul. 28, 1995.

[30] Foreign Application Priority Data

Aug. 18, 1994 [DE] Germany .................. 44 29 193.0

[51] Int. Cl.$^6$ .............. G02B 6/26; A61B 17/36
[52] U.S. Cl. .................. 385/31; 385/34; 385/88; 606/3; 606/15; 606/16
[58] Field of Search .................. 385/31, 34, 55, 385/58, 33, 38, 88; 606/3, 15, 16; 325/146; 372/9, 18, 19, 98, 103, 108

[56] References Cited

U.S. PATENT DOCUMENTS

| | | | |
|---|---|---|---|
| 4,674,835 | 6/1987 | Mimura et al. | 385/142 |
| 4,944,567 | 7/1990 | Kuper et al. | 385/31 |
| 4,995,691 | 2/1991 | Purcell, Jr. | 385/29 |
| 5,151,098 | 9/1992 | Loertscher | 606/16 |
| 5,196,004 | 3/1993 | Sinofsky | 606/3 |
| 5,407,443 | 4/1995 | Kobayashi et al. | 385/80 |
| 5,458,594 | 10/1995 | Mueller et al. | 606/3 |
| 5,619,602 | 4/1997 | Sandstrom et al. | 385/31 |

FOREIGN PATENT DOCUMENTS

| | | |
|---|---|---|
| 0 530 574 A2 | 3/1993 | European Pat. Off. . |
| 40 04 423 | 8/1990 | Germany . |
| 40 30 240 | 2/1991 | Germany . |
| WO 93/14432 | 7/1993 | WIPO . |

OTHER PUBLICATIONS

T. Seiler, et al, "Fundamental Mode Photoablation of the Cornea for Myopic Correction," *Lasers and Light in Ophthalmology*, vol. 5, No. 4, pp. 199–203, Amsterdam/New York, 1993.
D. Franzen, et al., "Standardizing Test Conditions for Characterizing Fibers," *Laser Focus*, vol. 17, Aug. 1981, pp. 103–105.
Abstract No. CN–A–1067530 of Japanese patent application 910103614.8, Dec. 30, 1992.
Patent Abstracts of Japan, vol. 6, No. 198, Oct. 7, 1982.
Patent Abstracts of Japan, vol. 9, No. 10, Jan. 17, 1985.
J. Dugas, et al., "Accurate Characterization of the Transmittivity of Large–Diameter Multimode Optical Fibers," *Applied Optics*, vol. 26, No. 19, Oct. 1987, pp. 4198–4208.

*Primary Examiner*—Hemang Sanghavi
*Attorney, Agent, or Firm*—Barry R. Lipsitz

[57] ABSTRACT

A device designed for generating a laser beam having a homogenized cross section has the following features:
a) a pulsed solid-state laser with an emission in a wavelength range of between 2 and 3 $\mu$m,
b) a pulse energy of between 100 $\mu$J and 1 J,
c) a transmission fiber made of a material transparent to the wavelength and having a length of at least 0.2 m and a diameter of between 50 and 1000 $\mu$m,
d) an end piece made of quartz or sapphire and having a length of between 4 and 50 mm, the end piece following the fiber and having plane end surfaces arrange perpendicular to the longitudinal direction.

18 Claims, 1 Drawing Sheet

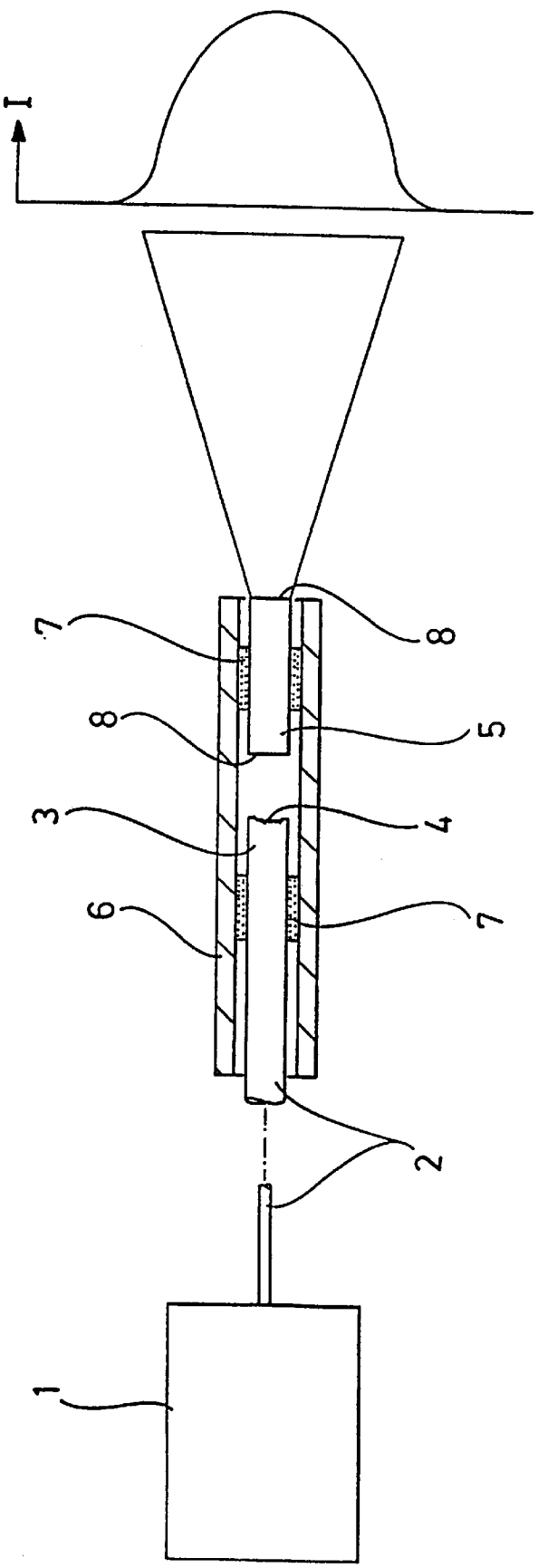

DEVICE FOR GENERATING A LASER BEAM HAVING A HOMOGENIZED CROSS SECTION AND USE OF THIS BEAM

The present disclosure relates to the subject matter disclosed in International Application No. PCT/EP95/03006 of Jul. 28, 1995, the entire specification of which is incorporated herein by reference.

BACKGROUND OF THE INVENTION

The invention relates to a device for generating a laser beam having a homogenized cross section. The invention also relates to use of this beam.

For the photoablation of tissue, for example, in the corneal area of the eye, it is known to use excimer lasers whose rectangular beam profile can be homogenized by various measures, some of which involve quite high expenditure, for example, by means of dispersion plates and diaphragms connected thereafter, by the use of abrasive diaphragms, by means of diaphragm changing devices for successive laser pulses or by scanning processes with altered diaphragm apertures. All these measures involve an extremely high apparatus expenditure, and yet sufficient homogenization of the beam cross section is not to be achieved in all cases.

It is known from international publication WO 93/14432 that a spatially homogenized radiation can be achieved by the laser radiation being passed through a transmission fiber of one-piece design. It has, however, been found that the use of such transmission fibers for the homogenization of the laser radiation does not produce satisfactory results in all cases. On the contrary, it was found that the degree of homogenization depends to a very great extent on the transmission fibers used and so the use of transmission fibers of one-piece design to obtain homogenized laser radiation produces results which are only reproducible in a unsatisfactory way.

It is also known that photoablation of tissue, in particular, on the cornea, can be achieved by solid-state lasers, for example, by an Er:YAG laser (Theo Seiler and Josef Wollensak in "Lasers and Light in Ophthalmology", Volume 5, No. 4, pages 199 to 203, 1993, Kugler Publications, Amsterdam/N.Y.).

This is based on the fact that such a laser emits a spatially homogeneous radiation in the fundamental mode $TEM_{00}$.

This is, in fact, not at all self-evident, as a solid state laser emits a mixture of modes in this range and so only part of the emitted energy is available for the particularly suited fundamental mode $TEM_{00}$. Apart from the fact that this results in an undesired spatial distribution of the laser radiation, the energies in the fundamental mode required for the ablation of the cornea are thus also insufficient.

The object of the invention is, therefore, to so design a device of the kind described at the outset that with relatively low apparatus expenditure, a mode-homogenized and spatially homogenized radiation which is particularly well suited for use in the photoablation of the cornea can be generated with it.

SUMMARY OF THE INVENTION

Proceeding from the device described at the outset, such a device is characterized by the following features:

a) a pulsed solid-state laser with an emission in a wavelength range of between 2 and 3 $\mu$m, b) a pulse energy of between 100 $\mu$J and 1 J, c) a transmission fiber made of a material transparent to the wavelength and having a length of at least 0.2 m and a diameter of between 50 and 1000 $\mu$m, d) an end piece made of a material transparent in the wavelength range of between 2 $\mu$m and 3 $\mu$m and having a length of between 4 and 50 mm, the end piece following the fiber and having plane end surfaces arranged perpendicular to the longitudinal direction. The end piece may, for example, consist of quartz, sapphire or YAG.

Surprisingly, it has been found that the radiation of a solid-state laser which is followed by such a transmission fiber with a minimum length is mode-homogenized in this transmission fiber.

However, a spatially homogenized, radially symmetrical emission with bell-shaped or Gaussian intensity distribution only occurs with such a transmission fiber when it has a plane-parallel end surface. This is very difficult to realize with the materials that are commonly employable. In the manufacture of these end surfaces faults often occur in the surface which result in damage when exposed to high-energy radiation.

It has now surprisingly been found that the combination of such a transmission fiber which does not have an exactly plane-parallel end surface with an end piece having plane end surfaces made of quartz or sapphire is suited to compensate this disadvantage. For, a spatial homogenization with an additional compensation of dissymmetries of the beam profile takes place again in the end piece, i.e., effects of an inexactly shaped fiber end are corrected, and, in this way, a divergent, rotationally symmetrical emission with Gaussian distribution is achieved.

In particular, this is also possible when, in accordance with a preferred embodiment, the transmission fiber is broken at its end. Such a broken surface does not exhibit any micro-defects which could cause damage when acted upon by radiation, but, on the other hand, the emitted radiation is not spatially homogenized.

This combination of a fiber and an end piece thus results in mode-homogenization in the fiber and in spatial homogenization in the end piece. In all, a radiation with a rotationally symmetrical profile is thereby obtained. This profile can also be altered by various parameters, for example, by variation of the length of the transmission fiber, the coupling angle and the coupling direction of the radiation as it enters the transmission fiber, by the flexure of the fiber or by the numerical aperture of the fiber. The mode mixtures emitted by the laser can thus be exploited to the full extent to generate a homogenized, radially symmetrical beam profile, for example, a Gaussian beam profile, a parabolic beam profile or a ring-shaped beam profile. In each case, this radially symmetrical distribution has a smooth intensity pattern, and there is no drastic decrease in the output energy of the laser by enforcing the fundamental mode $TEM_{00}$, as is unavoidable with other laser devices.

The higher total energy enables use of larger beam diameters and facilitates variation of the beam diameter. This radiation is thus particularly suited for photoablation of the cornea, for example, for photoablative, refractive keratectomy in the treatment of short-sightedness.

The solid-state laser can be, for example, one of the following lasers:

Er:YLF

Er:YAP

Er:YSGG

Er:YAG

Ho:YAG

Cr:Er:YSGG.

The transmission fiber may consist of $ZrF_4$, of a sapphire monocrystal, of quartz or other fibers transparent in the wavelength range of 2 μm to 3 μm (for example, silver halide fibers or chalcogenide fibers).

It is expedient for the end piece to consist of a quartz rod.

Use of a quartz fiber with a stepped profile or with a graded-index or gradient profile would also be possible.

The end piece can be formed by a sapphire fiber with polished end surfaces.

It is expedient for the spacing between transmission fiber and end piece to be between 0 and 20 mm.

The length of the laser pulses of the laser can be between 50 μs and 3 ms. However, the device is also suited or Q-switch pulses with pulse lengths of, for example, 10 ns to 1 μs.

BRIEF DESCRIPTION OF THE DRAWING

The following description of a preferred embodiment of the invention serves in conjunction with the drawing to explain the invention in more detail. The drawing shows schematically a device for generating a mode-homogenized and cross-section-homogenized laser beam.

DETAILED DESCRIPTION OF THE INVENTION

This device comprises a solid-state laser 1 of a type known per se which is, therefore, not described in greater detail. It can, for example, be one of the following lasers:

Er:YLF

Er:YAP

Er:YSGG

Er:YAG

Ho:YAG

CR:Er:YSGG

Ho:YAG or similar crystals emitting in the near-infrared range, such as, for example, Cr:Tm:Er:YAG Er:GGG.

The radiation exiting therefrom enters a transmission fiber 2. This is a fiber having a length of at least 0.2 m and an external diameter of between 50 and 1000 μm. The transmission fiber 2 consists, for example, of $ZrF_4$ or of another material which is transparent to the wavelength emitted by the solid-state laser 1. This wavelength is between 2 and 3 μm in the stated substances.

At the free end 3, the transmission fiber 2 terminate in a broken surface 4 and is followed at a spacing of between 0 and 20 mm by an end piece 5, for example, a quartz rod having a length of between 5 and 50 mm.

The free end of the transmission fiber 2 and the end piece 5 are jointly held in a metal sleeve 6 by means of, for example, an adhesive 7.

The end faces 8 of the end piece 5 are formed plane, for example, by polishing. They extend perpendicularly to the longitudinal axis of the end piece 5.

The laser radiation generated by this device is emitted divergently and exhibits a rotationally symmetrical radiation distribution which is mode-homogenized. For example, the intensity distribution over the cross section, which is indicated by way of an example in the drawing, can be a Gaussian distribution, a super Gaussian, a parabolic or also a ring-shaped distribution. This depends, inter alia on the length of the transmission fiber, on the entrance angle into the transmission fiber and also on the flexure of the transmission fiber.

It is, for example, possible to generate a ring-shaped distribution when the radiation enters the transmission fiber acentrically. By bending the transmission fiber an asymmetrical emission can be obtained, for example, in the form of a crescent-shaped distribution.

The radiation is usually introduced centrically and so a homogenized distribution with rotational symmetry is to be expected.

The radiation generated in this way is particularly suited for photoablation of the cornea, in particular, for correcting short-sightedness. In the border areas which lie below a certain threshold energy ablation does not take place. This ablation only starts where the energy of the radiation exceeds a certain threshold value. Owing to the smoothed configuration over the cross section, a precisely predictable distribution of the radiation is thus obtained, and by means of multiple illumination this distribution can be taken into account so as to achieve, in all, an ablation which is essentially uniform or corresponds to the desired profile.

We claim:

1. Apparatus for generating a laser beam having a homogenized cross section comprising:

a) a pulsed solid-state laser with an emission in a wavelength range of between about 2 and 3 μm, b) said laser having a pulse energy of between about 100 μJ and 1 J, c) a transmission fiber made of a material transparent to the wavelength of said emission and having a length of at least 0.2 m and a diameter of between about 50 and 1000 μm, said transmission fiber being arranged to receive pulses from said laser, and d) an end piece made of a material transparent in said wavelength range and having a length of between about 4 and 50 mm, said end piece following said transmission fiber and having plane end surfaces arranged perpendicular to a longitudinal axis of said end piece for emitting said laser beam, said end piece and transmission fiber being separated by a gap.

2. Apparatus as defined in claim 1, wherein said transmission fiber has an unpolished broken surface at an end thereof defining one side of said gap.

3. Apparatus as defined in claim 1, wherein said solid-state laser comprises a crystal doped with Er or Ho.

4. Apparatus as defined in claim 3, wherein said solid-state laser is an Er:YLF laser.

5. Apparatus as defined in claim 3, wherein said solid-state laser is an Er:YAP laser.

6. Apparatus as defined in claim 3, wherein said solid-state laser is a Cr:Er:YSGG laser.

7. Apparatus as defined in claim 3, wherein said solid-state laser is an Er:YAG laser.

8. Apparatus as defined in claim 3, wherein said solid-state laser is an Ho:YAG laser.

9. Apparatus as defined in claim 1, wherein said transmission fiber consists of ZrF4.

10. Apparatus as defined in claim 1, wherein said transmission fiber consists of a sapphire monocrystal.

11. Apparatus as defined in claim 1, wherein said end piece consists of a quartz rod.

12. Apparatus as defined in claim 1, wherein said end piece consists of a quartz fiber with a stepped profile.

13. Apparatus as defined in claim 1, wherein said end piece consists of a quartz fiber with a graded-index profile.

14. Apparatus as defined in claim 1, wherein said end piece consists of a sapphire fiber or another crystal with polished end surfaces which is transparent between about 2 $\mu$m and 3 $\mu$m.

15. Apparatus as defined in claim 1, wherein the gap between the transmission fiber and end piece is no more than about 20 mm.

16. Apparatus as defined claim 1, wherein a pulse length of pulses from said laser is between about 50 $\mu$s and 3 ms.

17. Apparatus as defined claim 1, wherein pulses from said laser are Q-switch pulses with a length of between about 10 ns and 1 $\mu$s.

18. A method for ablation of corneal tissue of an eye, comprising the steps of:

generating a laser beam having a homogenized cross section using a pulsed solid-state laser with an emission in a wavelength range of between about 2 and 3 $\mu$m, said laser having a pulse energy of between about 100 $\mu$J and 1 J, providing a transmission fiber made of a material transparent to the wavelength of said emission and having a length of at least about 0.2 meters and a diameter of between about 50 and 1000 $\mu$m, said transmission fiber being arranged to receive pulses from said laser, providing an end piece made of a material transparent in said wavelength range and having a length of between about 4 and 50 mm, and arranging said end piece such that it follows said transmission fiber with a gap between the end piece and transmission fiber, said end piece having plane end surfaces arranged perpendicular to a longitudinal axis of said end piece for emitting said laser beam, and using said laser beam to provide said ablation.

* * * * *